March 13, 1962 R. E. ARKO 3,025,346

PUNCH FOR USE IN TAPE TRANSMITTER

Filed Oct. 24, 1960

4 Sheets-Sheet 1

INVENTOR
ROBERT E. ARKO

BY E. A. Kane

ATTORNEY

March 13, 1962 R. E. ARKO 3,025,346

PUNCH FOR USE IN TAPE TRANSMITTER

Filed Oct. 24, 1960

4 Sheets-Sheet 2

INVENTOR
ROBERT E. ARKO

BY E. F. Kane

ATTORNEY

March 13, 1962 R. E. ARKO 3,025,346

PUNCH FOR USE IN TAPE TRANSMITTER

Filed Oct. 24, 1960 4 Sheets-Sheet 3

INVENTOR
ROBERT E. ARKO
BY E. J. Kane
ATTORNEY

March 13, 1962 R. E. ARKO 3,025,346

PUNCH FOR USE IN TAPE TRANSMITTER

Filed Oct. 24, 1960

4 Sheets-Sheet 4

INVENTOR
ROBERT E. ARKO

BY E. F. Kane

ATTORNEY 3,025,346

PUNCH FOR USE IN TAPE TRANSMITTER

Robert Edward Arko, Mount Prospect, Ill., assignor to Teletype Corporation, Skokie, Ill., a corporation of Delaware Filed Oct. 24, 1960, Ser. No. 64,515
11 Claims. (Cl. 178—17)

This invention relates to printing telegraph tape transmitters and more particularly to a printing telegraph tape transmitter incorporating in it mechanism for preventing the tape from being fed through the transmitter more than once.

It is an object of the present invention to provide a printing telegraph transmitter having therein apparatus for automatically stopping the operation of the transmitter if a tape is fed through it a second time after having been read once.

Another object of the invention is to provide a tape controlled printing telegraph transmitter with mechanism for perforating a hole in the tape after the tape has been read.

A further object of the invention is to provide a tape controlled printing telegraph transmitter with mechanism for perforating an extra hole in the tape for use in controlling the transmitter if the same tape is fed through it a second time.

In accordance with one embodiment of the invention as applied to a tape controlled telegraph transmitter using tape perforated with a five-unit start-stop permutation code wherein the tape is fed step by step past a series of sensing pins that on each step forward of the tape will be released to determine the presence or absence of perforations in the tape and that will control sequentially a signal generating contact in accordance with the location of perforations in the tape, there is provided a tape perforating punch for perforating a hole in the tape in an area of the tape outside of the area occupied by the five-unit permutation code perforations. In the preferred embodiment of the present invention a perforation is made in this area, which is the sixth code level of the tape, each time the sensing pins are released to sense a permutation code of perforations in the tape. A sixth sensing pin is provided which is aligned, in the apparatus, with the sixth code level of the tape and this sensing pin, upon finding a hole in the tape in the sixth level, will rock a transfer lever to position to actuate a leverage assembly that in turn controls a clutch trip magnet of the apparatus to stop the further feeding of tape through the apparatus and the consequent transmission of the message a second time.

In another embodiment of the invention the perforator for punching a hole in sixth level of the tape is released for operation each time the sensing pins are released to sense a new area of the tape but a blocking cam prevents the operation of the perforator mechanism five out of six sensing cycles of the apparatus and permits the perforation in every sixth sensing cycle of the apparatus. If it is desired to use the same tape a second time means is provided for blocking the operation of the sixth level perforator in either of two ways. One way in which the sixth level perforator can be blocked from operating is to rock a blocking pawl into its path and another way is to feed the tape over the die which cooperates with the perforator so that the tape does not move in a path where it will be perforated in the sixth level as the code permutations in the tape are sensed.

Other features and objects of the invention will become apparent from the following detailed description when considered in conjunction with the accompanying drawings wherein.

Figure 3:
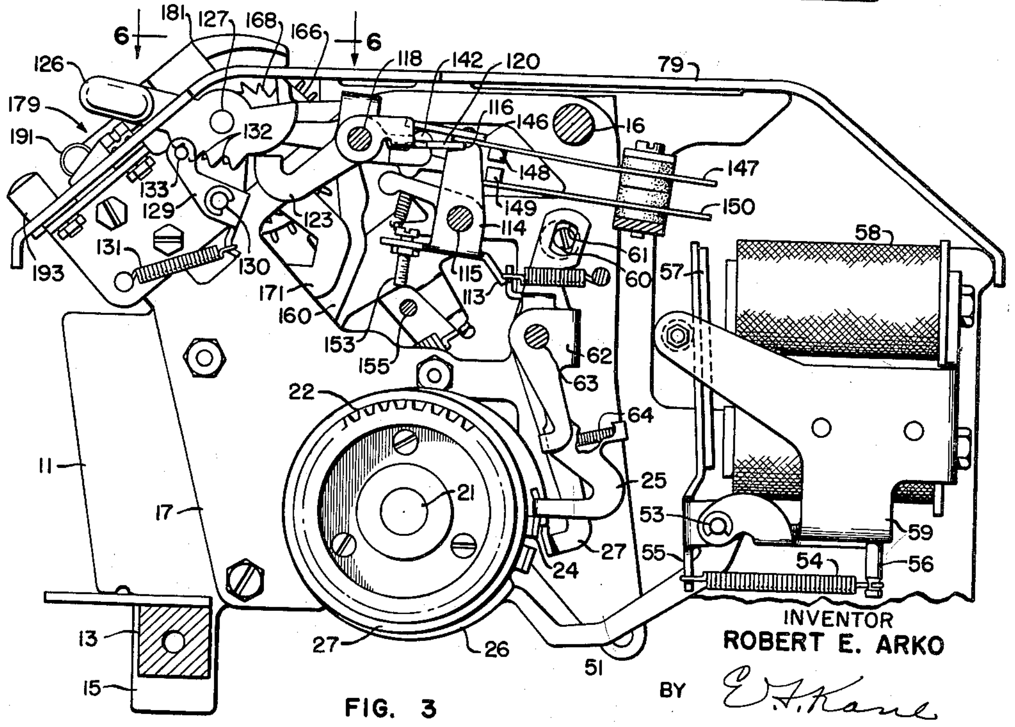
FIG. 3 is a vertical sectional view taken substantially along the line 3—3 of FIG. 1, in the direction of the arrows.
Figure 7:
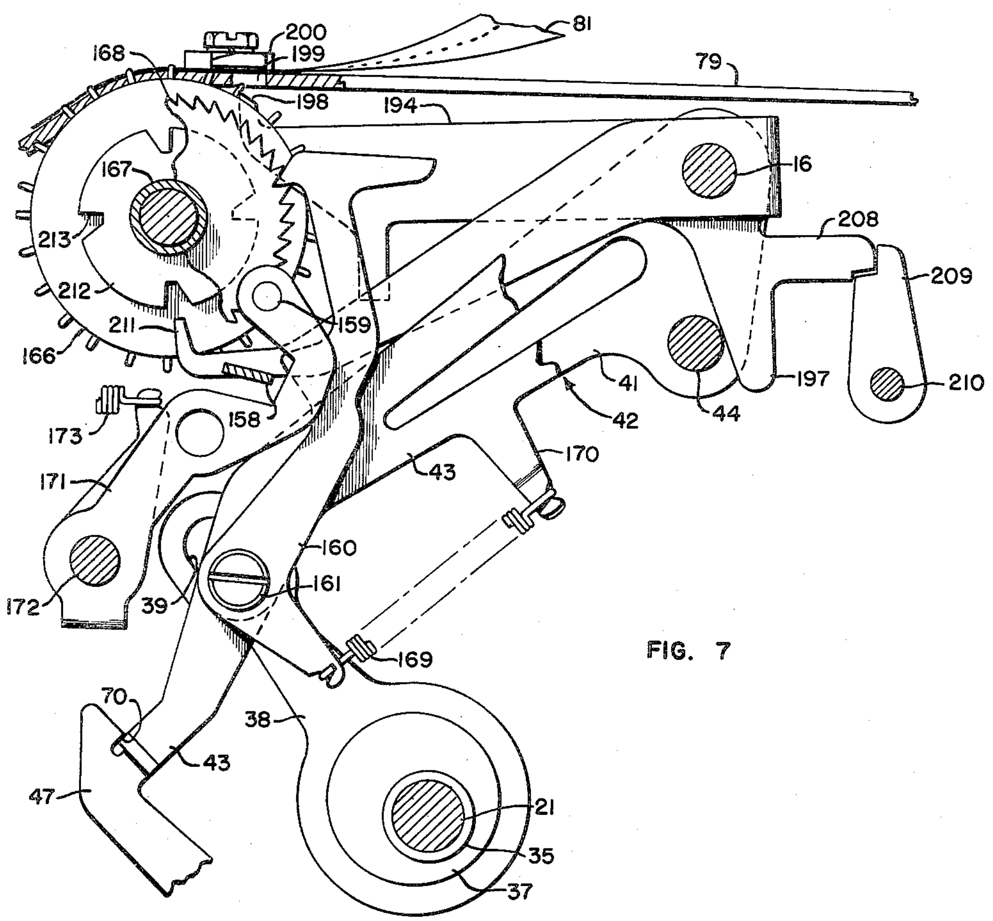
Figure 6:
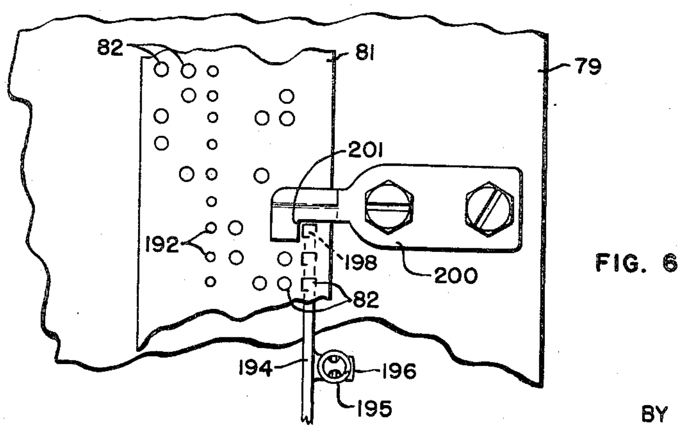

FIG. 6 is an enlarged fragmentary view taken substantially along the line 6—6 of FIG. 3, in the direction of the arrows, showing the die which cooperates with the perforator for perforating in the sixth level of the tape, and FIG. 7 is an enlarged fragmentary sectional view of an alternate of embodiment of the invention which perforates a hole in the tape every fifth time that the sensing pins are released to sense an area of the tape.

Figure 1:
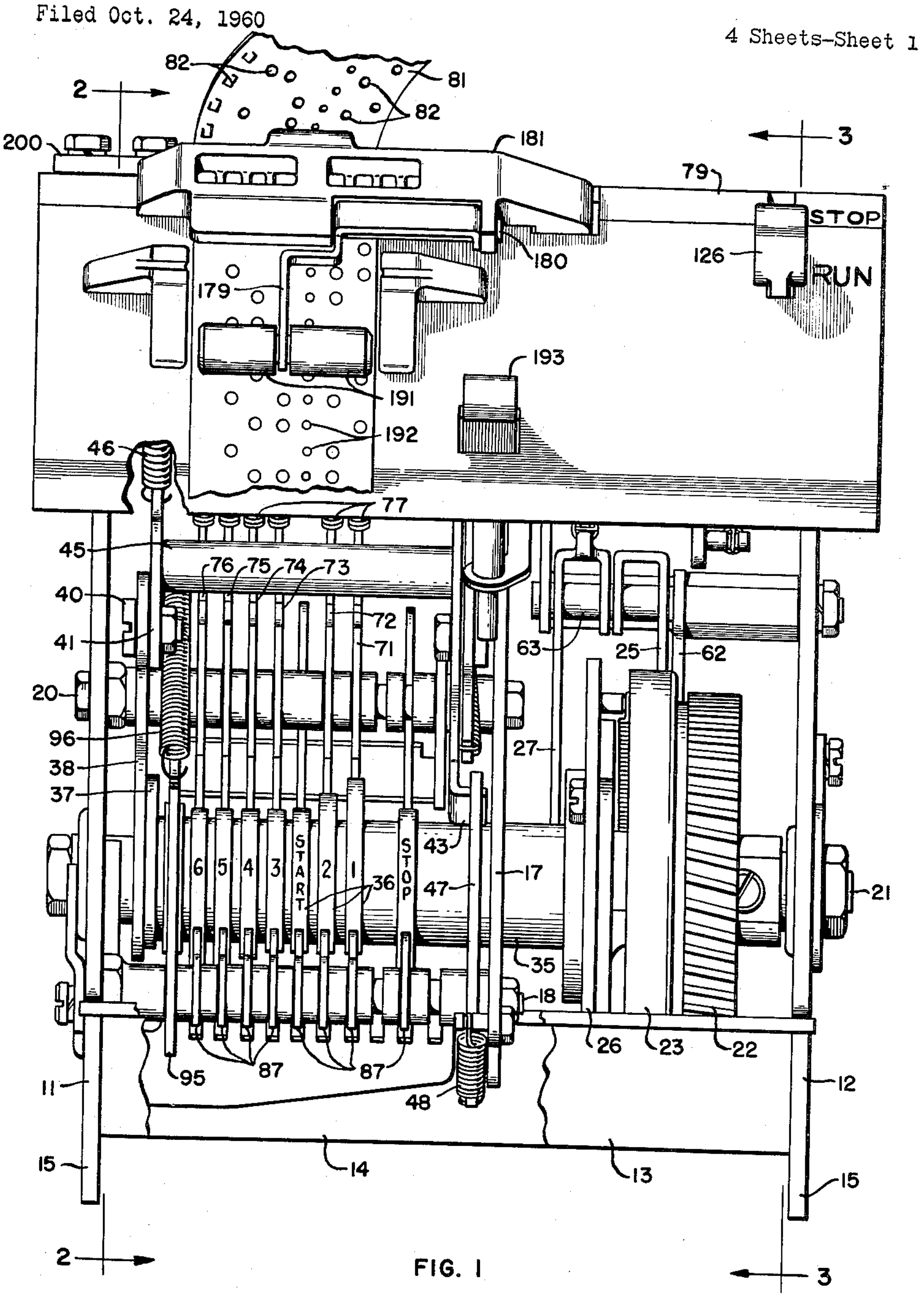
FIG. 1 is a front elevational view of the apparatus.
Figure 2:
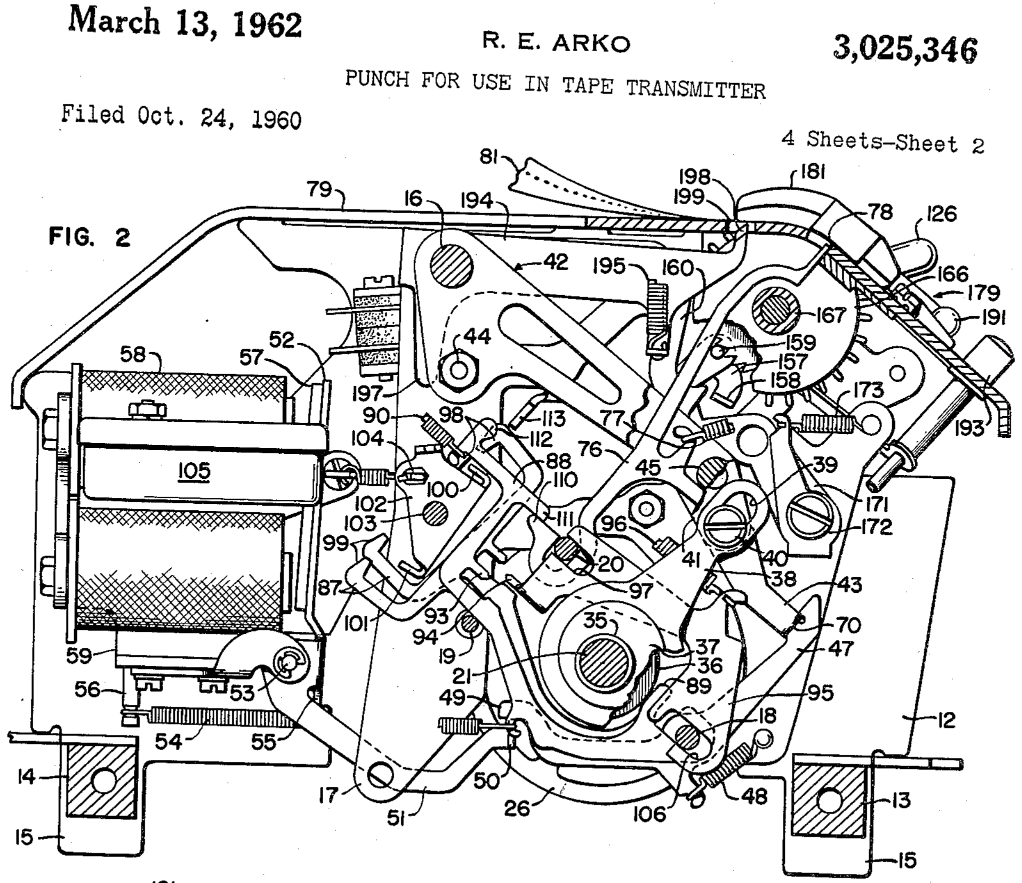
FIG. 2 is a vertical sectional view taken substantially along the line 2—2 of FIG. 1, in the direction of the arrows.

Referring now to the drawings wherein like reference characters designate the same parts throughout the several view, particular reference, at this time, being had to FIG. 1, it will be seen that the various units of the apparatus are mounted between a pair of side plates 11 and 12 which are held in spaced relation one to another by spacer bars 13 and 14 (FIG. 2). These spacer bars 13 and 14 are connected to the side plates 11 and 12 near the bottom of them and the plates 11 and 12 have downwardly extending projections or feed 15 which serve to support the apparatus when it is in use. In addition to being held in spaced relation by the spacer bars 13 and 14 the side plates are also held in spaced relation by a main bail pivot rod 16. An irregularly shaped center plate 17 is positioned between the side plates 11 and 12 and is supported in that position by the main bail pivot rod 16 (FIG. 2) and three posts 18, 19 and 20 which are fixed to the side plate 11.

The side plates 11 and 12 and the center plate 17 support the various parts of the mechanism. The side plates 11 and 12 have suitably journalled in them a drive shaft 21 having fixed to it a gear 22 that is continuously driven by any suitable gearing arrangement (not shown). The gear 22 has fixed to it a clutch drum 23 forming a part of a clutch mechanism such as that disclosed in detail in the patent to W. J. Zenner No. 2,678,118 issued May 11, 1954 which patent is incorporated herein by reference. This clutch includes a stop lug 24, which when its movement is blocked by a clutch trip lever 25, will effect the disengagement of the clutch drum 23 from a clutch disc 26. This particular type is so arranged that the momentum of the clutch disc 26, and the parts driven by it, will be sufficient to cause a slight rotary displacement between the clutch disc 26 and clutch drum 23 when the clutch trip lever 25 engages the stop lug 24. This displacement between the disc 26 and the drum 23 will be sufficient to permit a clutch latch lever 27 to fall behind a projection on the clutch disc 26 thereby to insure that there will be no drag on the clutch members when they are disengaged.

The clutch disc 26 is fixed to a cam sleeve 35 on which there are formed or assembled a plurality of cams 36 and an eccentric 37 for driving a drive arm 38. The drive arm 38 has a slot 39 formed in it into which there extends a main bail eccentric drive pin 40. As shown in FIG. 2, the pin 40, which may be rotated to adjust its operative relation to the slot 39, is at the lower end of the slot 39 and the drive arm 38 is in its uppermost position. The drive pin 40 in fixed to an arm 41 of a main driving bail 42 which is pivotally mounted on the main bail pivot rod 16. The main bail 42 has a second arm 43 which is also pivotally mounted on the main bail pivot rod 16 and the arm 41 and the arm 43 are connected together by a pair of crossrods 44 and 45 thus to form the rigid bail structure 42.

The main driving bail 42 is urged to rock in a counterclockwise direction (FIG. 2) about the main bail pivot rod 16 by a contractile spring 46 (FIG. 1) tending to move the lever 42 to a position where the main bail eccentric drive pin 40 would be at the upper end of the slot 39. However, the main driving bail 42 is prevented from rocking counterclockwise (FIG. 2) by a main bail latch 47. The main bail latch 47 is pivotally mounted on the post 18 and is urged to rotate in a counterclockwise direction (FIG. 2) by contractile spring 48. As shown in FIG. 2, the left end of the main bail latch 47 has a projection 49 that extends above a horizontally disposed portion 50 of an armature bail extension 51. The armature bail extension 51 is formed integrally with an armature bail 52 that is pivotally mounted on a pivot pin 53 and is urged to rock in a clockwise direction (FIG. 2) by a spring 54 that is fixed to a downwardly projecting portion 55 of it and to a pin 56. The armature bail 52 supports an armature 57 which is operatively associated with an electromagnet 58. The electromagnet 58 is mounted on a suitable bracket 59 that also supports the pivot pin 53 and is in turn mounted on the side plate 12.

Energization of the electromagnet 58 will attract its armature and consequently will cause the armature bail 52 to rock in a counterclockwise direction (FIG. 2), thus to carry the horizontally disposed portion 50 of the armature bail extension 51 upwardly into engagement with the projection 49 on the main bail latch 47. When this occurs the main bail latch 47 will be rocked in a clockwise direction (FIG. 2) to disengage a latching shoulder 70 on the main bail latch 47 from the right end of the arm 43 of the main driving bail 42 thus to permit the spring 46 to rock the main driving bail 42 in a counterclockwise direction (FIG. 2) until the drive pin 40 on it reaches the upper end of the slot 39 in the drive arm 38.

When the main driving bail 42 rocks counterclockwise (FIG. 2) it will move a pin 60 (FIG. 3), which extends from the cross rod 44 (FIG. 2), a short distance to the left (FIG. 3). The pin 60 extends into a slot 61 in a clutch trip bail 62 which is pivoted on a pin 63 suitably fixed to the side plate 12. The clutch trip lever 25 is also pivoted on the pin 63 and is urged to follow the clutch trip bail 62 by a contractile spring 64 attached to the bail 62 and lever 25. Thus, when the electromagnet 58 is energized it will release the main driving bail 42 which will in turn initiate a cycle of operation of the cam sleeve 35.

Figure 4:
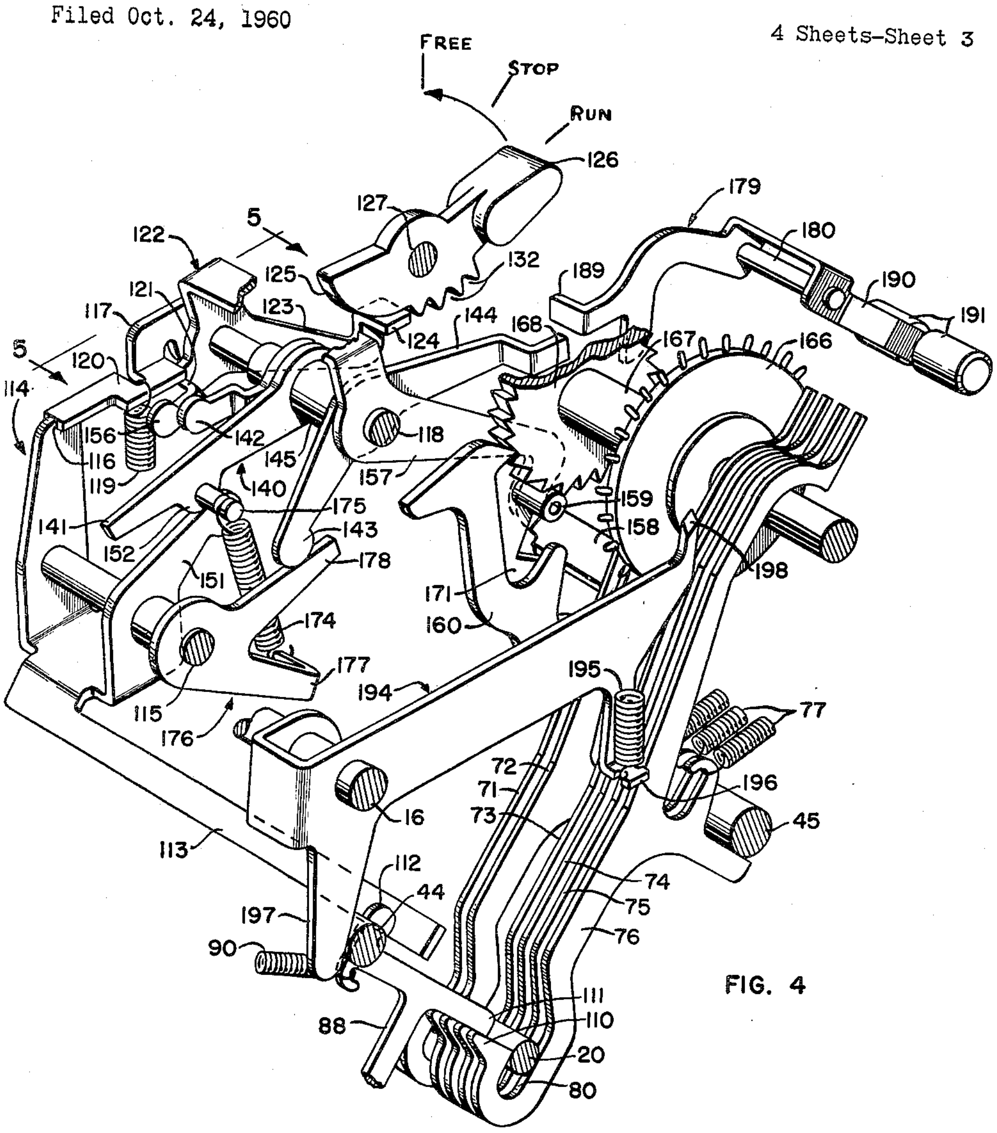
FIG. 4 is a perspective view showing the sensing pins, tape feeding means and the control means for stopping the apparatus either because the sixth level sensing pin has detected a hole in the tape, the tape has been exhausted, or the tape has become excessively taut between the supply thereof and the tape feed wheel and showing a manual control for the tape feed mechanism.

As the main driving bail 42 rocks in a counterclockwise direction (FIG. 2) under the influence of its spring 46, the cross rod 45 forming a part of the main driving bail 42 will also move upwardly to release a series of sensing fingers 71 to 76, inclusive, (FIG. 1) for actuation by their respective springs 77 (FIG. 2). There is a spring 77 individual to each one of the sensing fingers 71 to 76 but only one of them has been shown in FIGS. 2 and 4 to simplify the disclosure slightly. The springs 77 urge the sensing fingers 71 to 76 upwardly and to the right (FIG. 2) to cause the upper ends of the sensing pins to slide upwardly to the right while bearing against the right-hand edge (FIG. 2) of slots 78 individual to the sensing pins 71 to 76 and formed in a top plate 79 that is suitably secured to the side plates 11 and 12. As best seen in FIG. 4, the lower ends of the sensing fingers 71 to 76 are U-shaped to provide surfaces 80 on each of them which bear against the post 20 thus to provide a slidable and oscillatable support for the sensing fingers 71 to 76 to permit the sensing fingers to move upwardly under the action of their respective springs 77 to either engage an imperforate surface on a tape 81 or to go through perforations 82 in the tape 81 passing over the top plate 79. The slots 78 in the top plate 79 in combination with the slidable and oscillatable support provided by the post 20 cooperating with the surfaces 80 (FIG. 4) of the sensing fingers 71 to 76, will permit the sensing fingers to oscillate a slight amount during their retraction to the position shown in FIG. 2 and the concurrent feeding of the tape, thus permitting operation of the tape reader at a higher rate of speed than would otherwise be possible.

Each of the sensing fingers 71 to 75, inclusive, has associated with it a transfer lever 87 (FIG. 2) and the sensing finger 76 has associated with it a transfer lever 88 of slightly different construction than the transfer levers 87. All of the transfer levers 87 and 88 have camming projections 89 on them and are slidably mounted on the post 18 about which they may also be oscillated. The transfer lever 88 is normally urged upwardly and to the left (FIG. 2) by a contractile spring 90 which has one end attached to the transfer lever 88 and the other end attached to a part of the framework of the apparatus. Each of the transfer levers 87 has a hook 91 formed on it to which there is attached a contractile spring 92 that has its other end suitably attached to a part of the framework of the apparatus. Thus all of the transfer levers 87 and 88 are normally urged upwardly and to the left as viewed in FIG. 2 to carry their camming projection 89 into engagement with cams individual to them, such as the cams 36, mounted on the cam sleeve 35.

Each of the transfer levers 87 and 88 have a locking projection 93 formed on them which projects toward the cam shaft or drive shaft 21 for cooperation with a laterally extending locking projection formed on a transfer lever locking bail 95. This locking bail 95 is urged to move upwardly and to the left (FIG. 2) by a contractile spring 96 which has one end attached to the locking bail 95 and the other end attached to a portion of the frame work of the apparatus. The tranfer lever locking bail 95 is slidable on the posts 18 and 20, suitable slots 106 and 97 being formed in the locking bail to engage the posts 18 and 20. Each of the transfer levers 87 has a U-shaped portion at its upper left end as viewed in FIG. 2 on which there are inwardly extending fingers 98 and 99 for cooperation with the upwardly bent sides 100 and 101 of a contact actuating rocker member 102. The rocker member 102 is mounted for oscillation about a post 103 extending inwardly from the side plate 11. The rocker member 102 upon being oscillated due to the engagement of the upwardly bent sides 100 or 101 of it by the fingers 98 or 99, will actuate a contact lever 104 to actuate a contact assembly 105 of any suitable type, such for example as that disclosed in the Patent No. 2,605,366, issued to W. J. Zenner on July 29, 1952, to effect the transmission of current of no-current pulses over a transmission line connected to the contacts in the contact assembly thus to impress signals on a telegraph line.

The cams 36 are arranged on the cam sleeve 35 so that they will sequentially move their associated transfer levers 87 downwardly to the right (FIG. 2), in a sequence that is timed to actuate the rocker member 102 to generate five unit, start-stop permutation code signals. Since, in the transmission of this permutation code, the normal condition of the line is "marking" the start pulse is a "spacing" or no-current pulse. There are eight cams 36 on the cam sleeve 35. Two of these cams, designated "Start" and "Stop," respectively (FIG. 1), have no sensing fingers, such as sensing fingers 71 to 76, associated with them and their transfer levers 87 are always maintained in position to engage the fingers 98 and 99 on them, with the sides 100 and 101, respectively, of the rocker member 102. Since, as pointed out hereinbefore, the permutation code usually used is a five unit start-stop code, the "Start" cam actuates its transfer lever 87 first to rock the rocker member 102 in a clockwise direction, FIG. 2, to a "spacing" position. Next the cam 36 of the first code element moves its transfer lever 87 downwardly to the right (FIG. 2).

If the first element of the code being read by the sensing finger 71 is "marking" due to the fact that a perforation 82 is formed in the tape in the area associated with the sensing finger 71, the transfer lever 87 associated with the sensing finger 71 will be rocked in a clockwise direction (FIG. 2) to align the finger 99 on it with the side 101 of the rocker member 102. With the first lever 87 in this position, the high portion of the cam 36 will move the transfer lever 87 downwardly to the right to rock the rocker member 102 to a "marking" position. If the tape 81 is imperforate in the area associated with the sensing finger 71, indicating that a spacing or no-current pulse constitutes the first element of the code, the rocker member 102 will remain in the position to which it was rocked by the "Start" cam. The cams for the second, third, fourth and fifth code elements actuate their associated transfer levers 87 in sequence and consequently will rock the rocker member 102 to either its marking or spacing position depending upon the coding of perforations 82 in the tape 81. After the five transfer levers 87 associated with the code controlling sensing fingers 71 to 75 have sequentially controlled the rocker member 102, the cam 36 associated with the "Stop" transfer lever 87 moves its transfer lever 87 downwardly to the right to rock the rocker member 102 to the "marking" position. Thus, as the cam sleeve 35 goes through its cycle of rotation, it will cause the rocker member 102 to be rocked to first the "spacing" position to initiate a start-stop cycle and then to transmit "spacing" or "marking" signals in sequence and finally it will transmit a "marking" signal under control of the "Stop" lever which will invariably rock the rocker member 102 to a marking condition after the transmission of the five unit code.

The condition of the apparatus as shown in the drawings is that condition in which the apparatus would be after a cycle of operation of the cam sleeve wherein the sensing finger 76 detected either a perforation in the tape in the area associated with it or detected that the end of the tape had passed by the sensing point and the sensing finger 76 had consequently been permitted to move upwardly and to the right as viewed in FIGS. 2 and 4. In the event that the sensing finger 76 is permitted to move up due to one of the conditions just outlined a projection 110 formed adjacent its lower left hand end would engage a projecting portion 111 of the transfer lever 88 to rock the transfer lever 88 clockwise (FIG. 2) a short distance about the post 18.

Figure 5:
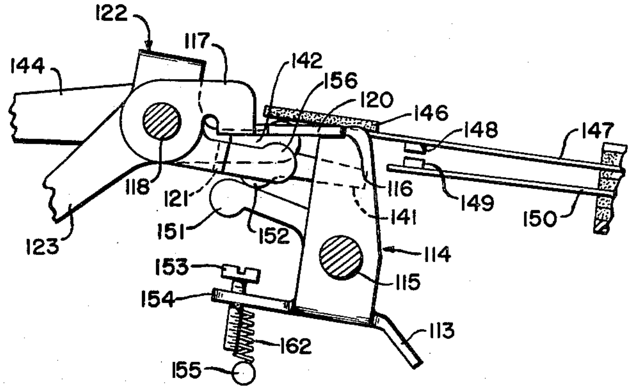
FIG. 5 is a fragmentary view, in elevation, taken substantially along the line 5—5 of FIG. 4, in the direction of the arrows, showing the mechanism which controls the circuit to the clutch trip magnet.

As a result of the sensing finger 76 moving upwardly and to the right, FIG. 4, it rocked the transfer lever 88 clockwise (FIG. 2) to carry an actuator knob 112 on the transfer lever 88 into position to engage a lever arm 113 when the transfer lever 88 is cammed downwardly and to the right by its associated cam 36 on the cam sleeve 35. The lever arm 113 is formed integrally with a latching bail 114 and when the lever arm 113 is rocked or actuated by the actuator knob 112 the latching bail 114 will be rocked in a counterclockwise direction, as viewed in FIG. 4, about its supporting pivot pin 115 that is mounted on center plate 17. The latching bail 114 has a latching notch 116 formed in it, which, when the bail 114 is rocked in a counterclockwise direction (FIG. 4) will latchingly engage a latch 117 that is pivotally mounted on a stud 118 extending from the center plate 17. The latch 117 is urged to rock in a counterclockwise direction, FIG. 4, clockwise direction FIG. 5, by a contractile spring 119. A flat portion 120 of the latch 117 lies in the path of movement of an actuator extension 121 formed on a control bail 122 also pivotally mounted on the stud 118. The control bail 122 has an arm 123 formed on it, a transversely extending portion 124 of which is positioned in operative relation to a cam portion 125 of a control lever 126. The control lever 126 is mounted for oscillation about a pin 127 and may be held in any one of three different positions by a detent pin 128 (FIG. 3) that is mounted on an oscillatable detent lever 129. The detent lever 129 is pivoted on a pin 130 and is urged to rock in a clockwise direction (FIG. 3) by a contractile spring 131. The pin 128 is resiliently urged into one of three notches 132 formed in the underside of the control lever 126 and will serve to hold the control lever 126 in whichever one of its run, stop or free wheeling positions to which it is moved.

Mounted for oscillation about the stud 118 intermediate the arms of the control bail 122 (FIG. 4) is a multi-armed lever 140 having arms 141, 142, 143 and 144 rigidly connected to its hub portion 145. The rounded end of the arm 142 is positioned directly below an insulator member 146 fixed to a contact spring 147 and when the multi-armed lever 140 is in the position shown in the drawings, the arm 142 will hold the contact spring 147 in the position shown where it will hold a contact element 148 on it out of engagement with a contact 149 on a contact spring 150 and thereby interrupt the operating circuit to the electromagnet 58. The multi-armed lever 140 is held in the position shown in FIGS. 4 and 5 of the drawings by an arm 151 of the latching bail 114 engaging a camming lobe 152 on the arm 141 of lever 140. The multi-armed lever 140 was moved to this position when the latching bail 114 was rocked to the position shown and latched in that position by the latch 117. Once the latching bail 114 is latched up in the position shown, it can only be released by manipulation of the control lever 126 which, when it is moved to the position indicated as "Free" in FIG. 4, will rock the control bail 122 clockwise through the inter-action of the cam portion 125 of the control lever 126 and the transversely extending portion 124 of the control bail 122. When the cam portion 125 of the control lever 126 rocks the control bail 122 in a clockwise direction (FIG. 4) about the stud 118, the actuator extension 121 on the bail 122 will lift the latch 117 against the action of its spring 119 thereby to release the latch 117 from the latching notch 116 in the latching bail 114, whereupon the latching bail 114 will be rocked in a clockwise direction (FIG. 4) (counterclockwise FIG. 5) by a contractile spring 162 seen only in FIG. 5. A stop member 153 adjustably mounted in an arm 154 of the latching bail 114 limits the amount of rotation of the latching bail 114 in a counterclockwise direction (FIG. 5) by engaging a pin 155 to which the spring 162 is attached.

The control bail 122 has formed on it a contact actuator arm 156 formed on and extending normal to the actuator extension 121. The rounded end of the actuator arm 156 is positioned to engage the insulator 146 and open the contact pair 148 and 149 when the control bail 122 is rocked clockwise (FIG. 4) (counterclockwise FIG. 5) due to the control lever 126 being moved to its middle position designated "Stop" in FIG. 4. Thus, the circuit to the electromagnet 58 may be interrupted by manually moving the control lever 126 to the stop position without latching up the latching bail 114. Obviously the bail 122 will also hold the contact pair 148—149 out of engagement one with the other when the control lever 126 is moved to the position designated "Free" (FIG. 4). The control bail 122 has a lever arm 157 extending from it, on the free end of which there is formed a pawl release arm 158 that will be moved to position to disable a ratchet detent roller 159 and a tape feed pawl 160 when the control lever 126 is moved to the position designated "Free" in FIG. 4.

The tape 81 is fed through the apparatus, in timed relation to the operation of the sensing fingers 71 to 76, by a tape feed sprocket wheel 166 fixed on a hub portion 167 on which there is also fixed a ratchet wheel 168. The ratchet wheel 168 is associated with the feed pawl 160 and is retained in any position to which the feed pawl 160 advances it by the ratchet detent roller 159. As may be seen most clearly in FIG. 7, the feed pawl 160 is pivoted on an eccentric drive pin 161 adjustably mounted on the arm 43 of main driving bail 42 and is urged to rock in a counterclockwise direction (FIG. 7) by a contractile spring 169 attached to a downwardly extending portion of it and to an extension 170 extending downwardly from the arm 43 of the main driving bail 42. The detent roller 159 is mounted on the free end of a detent bail 171 pivotally mounted on a post 172 that is in turn mounted on the center plate 17 and extends toward the side plate 11. The detent bail 171 is urged to rock in a clockwise direction (FIG. 2), (counterclockwise direction FIG. 7), by a contractile spring 173. Thus the feed pawl 160 and the detent roller 159 are urged by their respective springs into engagement with the ratchet wheel 168 but may be disengaged therefrom to permit free wheeling of the sprocket wheel 166 when a tape is being fed into or withdrawn from the apparatus and this may be effected by rocking the control lever 126 to its extreme left hand position as illustrated in FIG. 4 to the position designated "Free" which will rock the control bail 122 clockwise (FIG. 4), (counterclockwise FIG. 7), to engage the inner surfaces of the feed pawl 160 and detent bail 171 and rock them in a direction to disengage the pawl 160 and the detent roller 159 from the ratchet wheel 168.

A spring 174 is attached to a pin 175 (FIG. 4) that is fixed to the arm 141 and the other end of the spring 174 is attached to an arm 177 of a bell crank lever 176 pivotally mounted on the pivot pin 115. The bell crank lever 176 has a second arm 178 which engages the lower end of the arm 143 of the multi-armed lever 140 and the spring 174 thus tends to hold the latching bail 114 and the multi-armed lever 140 together for movement as a unit. The multi-armed lever 140 has its arm 144 positioned in the path of a taut tape bail 179 which is pivoted on a pin 180 (FIG. 4) mounted in a tape lid 181 (FIG. 2). The taut tape bail 179 has a laterally extending portion 189 (FIG. 4) that extends over into the path of the arm 144 of multi-armed lever 140. The taut tape bail 179 also has an arm 190 at the free end of which there are rotatably mounted a pair of tape engaging rollers 191.

The tape lid 181 is pivotally mounted on the top plate 79 and in the position shown in the drawings serves to hold the tape 81 in intimate engagement with the top surface of the top plate 79 so that the tape feed sprocket wheel 166 may engage in feed holes 192 in the tape 81 to advance the tape step by step through the apparatus. The tape lid 181 may be released from the position shown by manipulation of a tape release button 193 (FIG. 1) or it may be latched in the position shown by any suitable latching device operable under control of the button 193.

The main pivot rod 16 has oscillatably mounted on it a perforator bail 194 which is normally urged to rock in a clockwise direction (FIG. 7) or a counterclockwise direction (FIGS. 2 and 4) by a contractile spring 195 which has one end attached to a bent over portion 196 of the bail 194 and to a stationary portion of the apparatus. A downwardly extending arm 197 of the perforator bail 194 bears against the cross rod 44 of the main driving bail 42 and when the bail 42 is rocked to the position shown in the drawings the perforator bail 194 will be rocked in a clockwise direction as viewed in FIGS. 2 and 4 (a counterclockwise direction as viewed in FIG. 7), to the position shown in the drawings where the free end of the perforator bail 194 will hold a punch portion 198 formed on it out of the path of the tape 81 which is being fed through the apparatus. The top plate 79 has an aperture 199 (FIGS. 2 and 7) formed in it, through which this punch portion 198 may be moved when the latching shoulder 70 on the main driving bail 42 is released by the main bail latch 47. The release of the main driving bail 42 by its latch 47 will permit the spring 195 to rock the perforator bail 194 counterclockwise as viewed in FIGS. 2 and 4 and clockwise as viewed in FIG. 7, to perforate a hole in the tape 81 if the tape 81 has been passed under a die plate 200 mounted on the top plate 79 and having a shearing edge 201 on it, as illustrated in FIGS. 6 and 7, for cooperation with the punch portion 198 of the perforator bail 194.

As illustrated in the preferred embodiment of the invention shown in FIGS. 1 through 6, the perforator bail 194 will be operated once for each cycle of operation of the sensing pins 71 to 76, and will cause the punch portion 198 of the perforator bail 194 to perforate an aperture partially through the tape 81 in the area of the tape which is sensed by sensing pin 76. Thus any tape which has been fed through the apparatus and read once will have a perforation formed in it at the sixth level, that is the level associated with the sensing pin 76, and will cause the apparatus to stop in the event that an attempt is made to feed this tape through the apparatus a second time.

In the embodiment of the invention disclosed in FIG. 7 the perforator bail 194 has an extension 208 which will prevent the bail 194 from being actuated if a blocking element 209 is moved to the position shown in FIG. 7. If it is desired to perforate the tape to indicate that the tape has been read this blocking element 209 may be rocked in a clockwise direction about a pivot pin 210 on which it is mounted. In the embodiment of the invention disclosed in FIG. 7 the perforator bail 194 has an arm 211 formed on it for cooperation with a blocking cam 212 having four notches 213 formed in it into which the end of the arm 211 may enter when the perforator bail 194 is released by the cross rod 44 and permitted to rock in a clockwise direction. There are four of these notches 213 which will permit the perforator bail 194 to effect a perforation four times during each cycle of rotation of the ratchet wheel 168 to which the blocking cam 212 is attached and at any other time that the perforator bail 194 is released, the end of the arm 211 will strike the high portion of the blocking cam 212. Thus every sixth character space on the tape will have a perforation in it indicating that the tape has been read previously.

While the apparatus is designed to perforate a tape in the "sixth level" on the first passage of the tape 81 through the apparatus, it is possible to use the apparatus for repeatedly reading the same tape. This is accomplished by feeding the tape over the die plate 200, rather than between the die plate 200 and the top plate 79, on the first passage of the tape through the apparatus whereby the tape in being fed will not have any holes perforated in it by the punch portion 198. The tape may also be fed through the apparatus without perforating holes in the "sixth level" of the tape by blocking the operation of the perforator bail 194 by moving the blocking element 209 to the position shown in FIG. 7. Thus although the tape is fed between the top plate 79 and the die plate 200 the tape will not have perforations formed in it in the "sixth level" during its passage through the transmitter.

*Operation*

The apparatus, as shown in the drawings, is in the condition which it will occupy if the sensing finger 76 has either detected that the end of the tape has moved past the area where the sensing fingers 71 to 76 engage it in reading the permutation code perforations from it or where the sensing finger 76 has detected an aperture in the tape in the "sixth level" of tape 81. Once the apparatus has reached the condition shown, it can only be re-initiated into operation by placing a tape 81 under the tape lid 181 which tape does not have perforations in the "sixth level" of it, and by thereafter manipulating the control lever 126 to rock it in a counterclockwise direction as indicated in FIGS. 2 and 4 or a clockwise direction as indicated in FIG. 3 to move it to the "Free" position illustrated in FIG. 4. The movement of the control lever 126 to the "Free" position will rock the control bail 122 clockwise about the stud 118. In rocking in a clockwise direction (FIG. 4) the control bail 122 will carry the contact actuator arm 156 upwardly into engagement with the insulator member 146 to hold the contacts 148 and 149 out of engagement with each other and the control bail 122 will also move its actuator extension 121 into engagement with the flat portion 120 of the latch 117 to release the latch 117 from the latching notch 116 on the latching bail 114. As the latch 117 is released from the lever 114, the lever 114 will be rocked counterclockwise as viewed in FIGS. 4 and 5, by its contractile spring 162, to a position where the stop member 153 will engage the pin 155. As the latching bail 114 rocks in a clockwise direction, (FIG. 4), (counterclockwise direction, FIG. 5), it will move into position to later be contacted by the actuator knob 112 on transfer lever 188.

In addition to unlatching the latching bail 114, the control bail 122, when it is rocked in a clockwise direction, (FIG. 4), will move the pawl release arm 158 into engagement with the detent bail 171 and the feed pawl 160 to disengage them from the ratchet wheel 168, thereby permitting movement of the tape to position to initiate a new cycle of transmission by the transmitter apparatus. With the apparatus in this condition the transmission of a message may be initiated by rocking the control lever 126 manually back to the "Run" position. As the control lever 126 is rocked "Run" position, springs 169 and 173 (FIG. 7) will be permitted to restore the feed pawl 160 and the detent roller 159 to engagement with the ratchet wheel 168. As the springs 169 and 173 move the feed pawl 160 and the ratchet detent roller 159 back into engagement with the ratchet 158, the control bail 122 will be rocked back to its normal position thereby releasing the insulator member 146 and permitting the contact pair 148—149 to re-engage thereby to supply current to the electromagnet 58. It will be understood that, as the latching bail 114 was restored to its unlatched position, its arm 151 rocked clockwise, (FIG. 4), and through the action of the spring 174 which tends to hold the camming lobe 152 and arm 151 in engagement one with the other, the multi-armed lever 140 will be rocked counterclockwise (FIG. 4), to release the arm 142 from engagement with the insulator member 147 thus to permit the contact pair 148—149 to reclose.

Energization of the electromagnet 58 will cause it to attract its armature 57 thereby to rock the armature bail extension 51 in a counterclockwise direction as viewed in FIG. 2. As the armature bail extension 51 moves in a counterclockwise direction, (FIG. 2), the horizontally disposed portion 50 of it will engage the projection 49 on the main bail latch 47 thereby to rock the main bail latch 47 in a clockwise direction, FIG. 2, to release the main driving bail 42 thereby permitting the sensing fingers 71 to 76 to move upwardly and to the right, (FIG. 2). As the sensing fingers 71 to 76 move upwardly and to the right, (FIG. 2), under the influence of their springs 77 they will detect the presence or absence of perforations in the tape 81. Those sensing fingers 71 to 75 which find perforations 82 in the tape 81 will move upwardly into the right far enough to rock the respective transfer levers 87 to the right or clockwise about the post 18 to place the latching projections 93 on them to the upper right-hand side of the latching projection 94 on the transfer bail locking lever 95.

As the main driving bail 42 rocks in a counterclockwise direction, (FIG. 2) upon being released by the main bail latch 47, the pin 60 which is an extension of the cross rod 44 will be moved a short distance to the left as viewed in FIG. 3 and since this pin 60 moves in a slot 61 in the clutch trip bail 62, the clutch trip bail 62 will be rocked counterclockwise, (FIG. 3), to carry the clutch trip lever 25 with it and move the end of the clutch trip lever 25 out of blocking relation with the stop lug 24, when the stop lug 24 is thus unblocked a driving connection will be made between the shaft 21 and the cam sleeve 35 thereby to initiate a cycle of operation of the apparatus.

The first operation effected by the cam sleeve 35 will be the movement of the transfer lever locking bail 95 upwardly to the left as viewed in FIG. 2 to move the locking projection 94 on it up into locking relation with the projections 93 on the transfer levers to hold the transfer levers 87 in the position to which they were set by the sensing fingers 71 to 75 and to hold the transfer lever 88 in the position to which it may have been advanced by the sensing finger 76 finding a perforation in the tape in the "sixth level." When the ends of the transfer levers 87 and 88 have thus been blocked in the set positions, the cam sleeve 35 will move its cams 36 through one cycle of rotation, thereby to sequentially move the transfer levers 87 associated with the sensing fingers 71, 72, 73, 74 and 75 down and to the right as viewed in FIG. 2 to rock the rocker member 102 and cause the contact assembly 105 to transmit "marking" or "spacing" pulses over a line connected to the contact assembly 105.

Transmission of the permutation code signals will continue as long as there are no apertures found in the tape at the "sixth level" and as long as there is tape in the apparatus and further as long as the apparatus is not stopped due to a taut tape condition as detected by the taut tape bail 179. The apparatus will continue to run until the control lever 126 is rocked from the "Run" position, the tape is exhausted, the tape becomes taut, or a perforation is found in the tape 81 at the "sixth level."

In the event that the supply of tape is exhausted and the sensing finger 76 is permitted to move to a right-hand upward position (FIG. 2), or in the event that the sensing finger 76 finds a perforation in the tape at the "sixth level" and is consequently permitted to move to its extreme upper position, the transfer lever 88 will be rocked clockwise about the post 18 to carry the actuator knob 112 on it into alignment with the lever arm 113 of the latching bail 114. If the transfer lever 88 is thus permitted to rock in a clockwise direction, (FIG. 2), it will, when it is moved downwardly and to the right by its associated cam 36 on the cam sleeve 35, rock the latching bail 114 in a counterclockwise direction, (FIG. 4), to permit the latch 117 to drop down into blocking relation with the latching notch 116 on the lever 114. When this occurs the multi-armed lever 140 will be rocked in a clockwise direction through the inter-action of the arm 151 of the latching bail 114 and cam lobe 152 on the multi-armed lever 140. When the multi-armed lever 140 is rocked in a clockwise direction, FIG. 4, it will move its arm 142 upwardly to engage the insulator member 146 and open the circuit between the pair of contacts 148 and 149 thus to deenergize the electromagnet 58. When the latching bail 114 is latched up it will remain latched until it is released by moving the manually operable lever 126 all the way up to the "Free" position (FIG. 4).

In the event that the supply of tape being fed to the apparatus is not being supplied to the apparatus as fast as the apparatus can transmit the signals, there is a possibility that the tape between some other piece of apparatus preparing the tape and the present apparatus may become taut. When this occurs the taut tape bail 179 will be rocked in a counterclockwise direction as viewed in FIG. 4 about its pivot pin 180 and will cause its laterally extending portion 189 to engage the arm 144 of the multi-armed lever 140 thereby to rock the multi-armed lever 140 slightly in a clockwise direction (FIG. 4). When this occurs the cam lobe 152 will move out of engagement with the arm 151 of the latching bail 114 and the arm 142 of the multi-armed lever 140 will engage the insulator member 146 to open the circuit between the contacts 148 and 149. As soon as this taut tape condition is relieved and the taut bail 179 is permitted to rock back to its normal position the feeding of tape through the apparatus will be resumed due to the fact that the latching bail 114 is not displaced when this action occurs.

The apparatus may also be stopped by moving the manually operable control lever 126 to the position designated "Stop" in FIG. 4. This operation of the control lever 126 will, through the inter-action of the transversely extending portion 124 of the control bail 122 and the cam portion 125 of the control lever 126, move the contact actuator arm 156 of the control bail 122 upwardly to engage the insulator member 146 and open the circuit between the contacts 148 and 149. The feeding of tape may be resumed after such an operation by simply moving the control lever 126 back to the "Run" position.

Each time the main driving bail 42 is released by the latching shoulder 70 it will be rocked in a counterclockwise direction as viewed in FIG. 2, a clockwise direction as viewed in FIG. 7, by its spring 46, FIG. 1. Since the perforator bail 194 is urged to rock in a counterclockwise direction (FIG. 2), a clockwise direction (FIG. 7), by its contractile spring 195, the perforator bail will carry its punch portion 198 upwardly through the aperture 199 and if the tape 81 has been placed under the die plate 200, the punch portion 198 of the perforator bail 194 will, in cooperation with the shearing edge 201 of the die plate 200 perforate an aperture in the tape 81 at the "sixth level" of the tape. In the embodiment of the invention disclosed in FIGS. 1 to 6 the tape 81 will be perforated at the "sixth level" each time a row of perforations in the tape 81 representing characters are read. Consequently, if such a tape 81 is again sent through the apparatus, it will stop the operation of the apparatus through the detection of this perforation in the "sixth level" in the tape by the sensing finger 76. As pointed out hereinbefore it is possible to provide a blocking element such as blocking element 209 shown in FIG. 7 to block the operation of the perforator bail 194 if it is desired to feed the tape through the apparatus without perforating apertures in the sixth level of the tape.

In the embodiment of the invention disclosed in FIG. 7 the perforator bail 194 will tend to follow the main driving bail 42 each time the main driving bail 42 is released by the latching shoulder 70 on the main bail latch 47. However, the tape will only be perforated in the "sixth level" four times during the rotation of the tape feed sprocket 166 through one complete cycle of rotation or approximately once for every six rows of perforations in the tape. This blocking of the perforator bail 194 from following the main driving bail 142 is effected by the blocking cam 212 blocking the arm 211 of the perforator bail 194 at all points of the circumference of the blocking cam 212 except where the notches 213 are formed in the blocking cam 212.

Although particular embodiments of the invention are shown in the drawings and described in the foregoing specification it will be understood that invention is not limited to those specific embodiments described but is capable of modification and rearrangement and substitution of parts and elements without departing from the scope of the invention.

What is claimed is:

1. A tape controlled printing telegraph transmitter comprising means for sensing a plurality of levels of a perforated tape, means for actuating said sensing means, means controlled by the sensing means associated with predetermined ones of said levels for transmitting permutation code signals, means operated by said actuating means for perforating a hole in the tape in the other one of said levels, and means controlled by a sensing means associated with another one of said levels for stopping said actuating means.

2. A tape controlled printing telegraph transmitter comprising means for sensing a plurality of levels of a perforated tape, means for actuating said sensing means, means controlled by the sensing means associated with predetermined ones of said levels for transmitting permutation code signals, means operated by said actuating means for perforating a hole in the tape in the other one of said levels, means controlled by a sensing means associated with another one of said levels for stopping said actuating means, and means selectively operable to block operation of the means for perforating a hole in the tape in the other one of said levels.

3. A tape controlled printing telegraph transmitter comprising means for sensing a plurality of levels of a perforated tape, means for actuating said sensing means, means controlled by the sensing means associated with predetermined ones of said levels for transmitting permutation code signals, means operated by said actuating means for perforating a hole in the tape in the other one of said levels, means controlled by a sensing means associated with another one of said levels for stopping said actuating means, latching means operative to hold said stopping means operated, and manipulatable means for releasing said latching means.

4. A tape controlled printing telegraph transmitter comprising means for sensing a plurality of levels of a perforated tape, means for advancing a tape step by step to present successive areas thereof to operative association with said sensing means, means for actuating said sensing means each time a successive area of the tape is moved to operative association with the sensing means, means controlled by the sensing means associated with predetermined ones of said levels for transmitting permutation code signals, means controlled by a sensing means associated with another one of said levels for stopping said actuating means, and means operated by said actuating means for perforating a hole in the tape in the other one of said levels comprising a perforator bail having a punch portion, a die positioned adjacent to said sensing means for cooperation with said punch portion, means for urging said perforator bail to move its punch portion into operative relation to said die, and means on the actuating means for the sensing means for retracting said punch portion away from said die.

5. A tape controlled printing telegraph transmitter comprising means for sensing a plurality of levels of a perforated tape, means for advancing a tape step by step to present successive areas thereof to operative association with said sensing means, means for actuating said sensing means each time a successive area of the tape is moved to operative association with the sensing means, means controlled by the sensing means associated with predetermined ones of said levels for transmitting permutation code signals, means controlled by a sensing means associated with another one of said levels for stopping said actuating means, and means operated by said actuating means for perforating a hole in the tape in the other one of said levels comprising a perforator bail having a punch portion, a die positioned adjacent to said sensing means for cooperation with said punch portion, means for urging said perforator bail to move its punch portion into operative relation to said die, and means driven by the tape advancing means for blocking the movement of the perforator bail toward the die for a predetermined number of step by step advancements of the tape out of a series of such advancements whereby the tape is perforated in the other one of said levels in one out of several rows of perforations.

6. A tape controlled printing telegraph transmitter comprising means for sensing a plurality of levels of a perforated tape, means for advancing a tape step by step to present successive areas thereof to operative association with said sensing means, means for actuating said sensing means each time a successive area of the tape is moved to operative association with the sensing means, means controlled by the sensing means associated with predetermined ones of said levels for transmitting permutation code signals, means controlled by a sensing means associated with another one of said levels for stopping said actuating means, and means operated by said actuating means for perforating a hole in the tape in the other one of said levels comprising a perforator bail having a punch portion, a die positioned adjacent to said sensing means for cooperation with said punch portion, means for urging said perforator bail to move its punch portion into operative relation to said die, and means movable to position to block the movement of the perforator bail toward the die.

7. A tape controlled printing telegraph transmitter comprising a drive shaft, cam means connectible to said drive shaft for actuation thereby, a main driving bail, an eccentric on said cam means for rocking said bail in one direction to a set position, means for latching said bail in the set position, an electromagnet energizable to release said latching means, means rendered operable by the release of said latching means for moving the main driving bail in the opposite direction, means actuated by said main driving bail for causing said cam means to be connected to said drive shaft, sensing members movable to engage a tape for simultaneously sensing a plurality of levels of a perforated tape spring means tending to move said members toward the tape, means on the main driving bail for retracting said sensing members away from the tape, means controlled by the sensing members associated with predetermined ones of said levels of the tape for transmitting permutation code signals, means controlled by a sensing member associated with another one of said levels for de-energizing said electromagnet, a perforator bail, means urging said perforator bail to move with said main bail, a punch portion on said perforator bail for punching a hole in said other level of the tape when said perforator bail moves with said main bail, and means movable to position to block said perforator bail from moving with said main bail in said opposite direction.

8. A tape controlled printing telegraph transmitter comprising a drive shaft, cam means connectible to said drive shaft for actuation thereby, a main driving bail, an eccentric on said cam means for rocking said bail in one direction to a set position, means for latching said bail in the set position, an electromagnet energizable to release said latching means, means rendered operable by the release of said latching means for moving the main driving bail in the opposite direction, means actuated by said main driving bail for causing said cam means to be connected to said drive shaft, sensing members movable to engage a tape for simultaneously sensing a plurality of levels of a perforated tape, spring means tending to move said members toward the tape, means on the main driving bail for retracting said sensing members away from the tape, means controlled by the sensing members associated with predetermined ones of said levels of the tape for transmitting permutation code signals, means controlled by a sensing member associated with another one of said levels for de-energizing said electromagnet, a perforator bail, means urging said perforator bail to move with said main bail, and a punch portion on said perforator bail for punching a hole in said other level of the tape when said perforator bail moves with said main bail.

9. A tape controlled printing telegraph transmitter comprising a drive shaft, cam means connectible to said drive shaft for actuation thereby, a main driving bail, an eccentric on said cam means for rocking said bail in one direction to a set position, means for latching said bail in the set position, an electromagnet energizable to release said latching means, means rendered operable by the release of said latching means for moving the main driving bail in the opposite direction, means actuated by said main driving bail for causing said cam means to be connected to said drive shaft, sensing members movable to engage a tape for simultaneously sensing a plurality of levels of a perforated tape, spring means tending to move said members toward the tape, means on the main driving bail for retracting said sensing members away from the tape, means driven by said cam means for advancing the tape step by step to present rows of perforations therein to said sensing members, means controlled by the sensing members associated with predetermined ones of said levels of the tape for transmitting permutation code signals, means controlled by a sensing member associated with another one of said levels for de-energizing said electromagnet, a perforator bail, means urging said perforator bail to move with said main bail, a punch portion on said perforator bail for punching a hole in said other level of the tape when said perforator bail moves with said main bail, and means driven with the tape advancing means to block said perforator bail from moving with said main bail in said opposite direction for a predetermined number of steps of advancement of the tape out of a series of such steps of advancement.

10. A tape controlled printing telegraph transmitter comprising a drive shaft, cam means connectible to said drive shaft for actuation thereby, a main driving bail, an eccentric on said cam for rocking said bail in one direction to a set position, means for latching said bail in the set position, an electromagnet energizable to release said latching means, means rendered operable by the release of said latching means for moving the main driving bail in the opposite direction, means actuated by said driving bail for causing said cam means to be connected to said drive shaft, sensing members movable to engage a tape for simultaneously sensing a plurality of levels of a perforated tape, spring means tending to move said members toward the tape, means on the main driving bail for retracting said sensing members away from the tape, means driven by said cam means for advancing the tape step by step to present rows of perforations therein to said sensing members, means controlled by the sensing members associated with predetermined ones of said levels of the tape for transmitting permutation code signals, means controlled by a sensing member associated with another one of said levels for de-energizing said electromagnet, a perforator bail having a cam engaging arm, means urging said perforator bail to move with said main bail, a punch portion on said perforator bail for punching a hole in said other level of the tape when said perforator bail moves with said main bail, and a blocking cam driven with the tape advancing means and having high portions to block said cam engaging arm of the perforator bail to prevent the perforator bail from moving with said main bail in said opposite direction and having spaced notches into which said cam engaging arm may move to unblock the perforator bail.

11. A tape controlled printing telegraph transmitter comprising a drive shaft, cam means connectible to said drive shaft for actuation thereby, a main driving bail, an eccentric on said cam means for rocking said bail in one direction to a set position, means for latching said bail in the set position, an electromagnet energizable to release said latching means, means rendered operable by the release of said latching means for moving the main driving bail in the opposite direction, sensing members movable to engage a tape for simultaneously sensing a plurality of levels of a perforated tape, spring means tending to move said members toward the tape, means on the main driving bail for retracting said sensing members away from the tape, means controlled by the sensing members associated with predetermined ones of said levels of the tape for transmitting permutation code signals, means controlled by a sensing member associated with another one of said levels for de-energizing said electromagnet, a perforator bail, means urging said perforator bail to move with said main bail, a punch portion on said perforator bail for punching a hole in said other level of the tape when said perforator bail moves with said main bail, and a punch plate for cooperation with said punch portion.

No references cited.